United States Patent [19]

Simpson et al.

[11] Patent Number: 5,193,765
[45] Date of Patent: Mar. 16, 1993

[54] SEATING

[75] Inventors: Leslie J. Simpson, Amersham; Brian S. Bayliss, Peppard, both of United Kingdom

[73] Assignee: Magerik Ltd., Chinnor, United Kingdom

[21] Appl. No.: 768,908
[22] PCT Filed: Apr. 6, 1990
[86] PCT No.: PCT/GB90/00529
§ 371 Date: Oct. 7, 1991
§ 102(e) Date: Oct. 7, 1991
[87] PCT Pub. No.: WO90/11930
PCT Pub. Date: Oct. 18, 1990

[30] Foreign Application Priority Data

Apr. 6, 1989 [GB] United Kingdom ............... 8907759

[51] Int. Cl.[5] ............................................. B64D 11/06
[52] U.S. Cl. .................. 244/118.6; 297/237; 297/238; 297/125
[58] Field of Search ............... 244/118.5, 118.6; 297/232, 234, 237, 238, 125

[56] References Cited

U.S. PATENT DOCUMENTS

| 3,374,032 | 3/1968 | Del Giadize | 297/394 |
|---|---|---|---|
| 3,743,351 | 7/1973 | Harris | 297/107 |
| 4,533,175 | 8/1985 | Brennan | 297/232 |
| 4,768,832 | 9/1988 | Dain | 297/414 |
| 4,881,702 | 11/1989 | Slettebak | 244/118.6 |

FOREIGN PATENT DOCUMENTS 0335018 10/1989 European Pat. Off. ......... 244/118.6
1037972 8/1966 United Kingdom .

Primary Examiner—Joseph F. Peters, Jr.
Assistant Examiner—Christopher P. Ellis
Attorney, Agent, or Firm—Griffin, Butler, Whisenhunt & Kurtossy

[57] ABSTRACT

An aircraft seat convertible in situ for economy class and business class usage is described herein. In the case of a two-seater convertible seat, arm dividers are movably mounted on a seat frame for positioning thereon according to required widths of seating positions and to eliminate a middle seating position for business usage. Seat backs of two outer seating positions may be provided with mechanisms, such as slidable panels, which operate to vary the widths of the seat backs in the business class position. Alternatively, the seat backs are bodily movable on the seat frame and provided with hinge-mounted side bolsters of a compressible foam material which can be opened outwardly to increase the widths of the backs of the two outer seats with those backs moved to the two-seater business class configuration on the seat frame and the middle seating position eliminated.

12 Claims, 5 Drawing Sheets

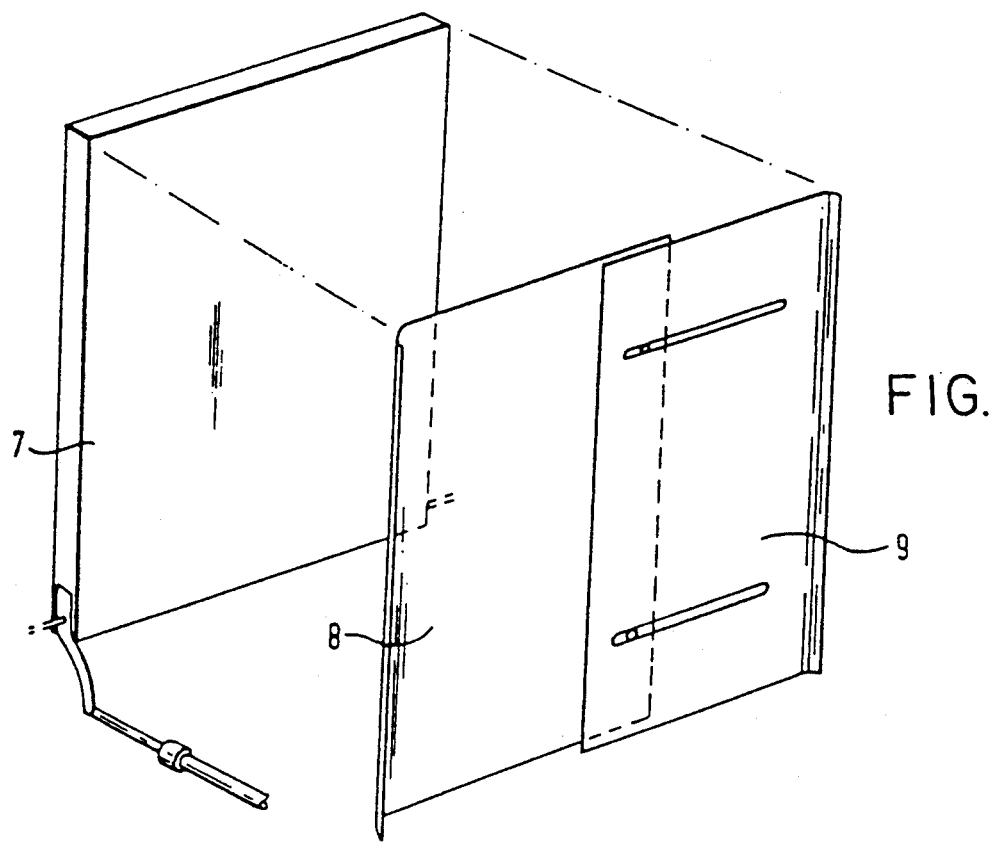
FIG. 3C
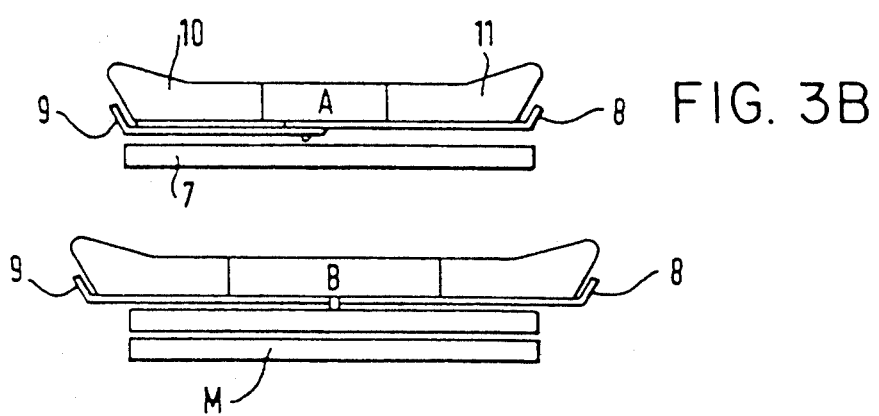
FIG. 3B
FIG. 3A

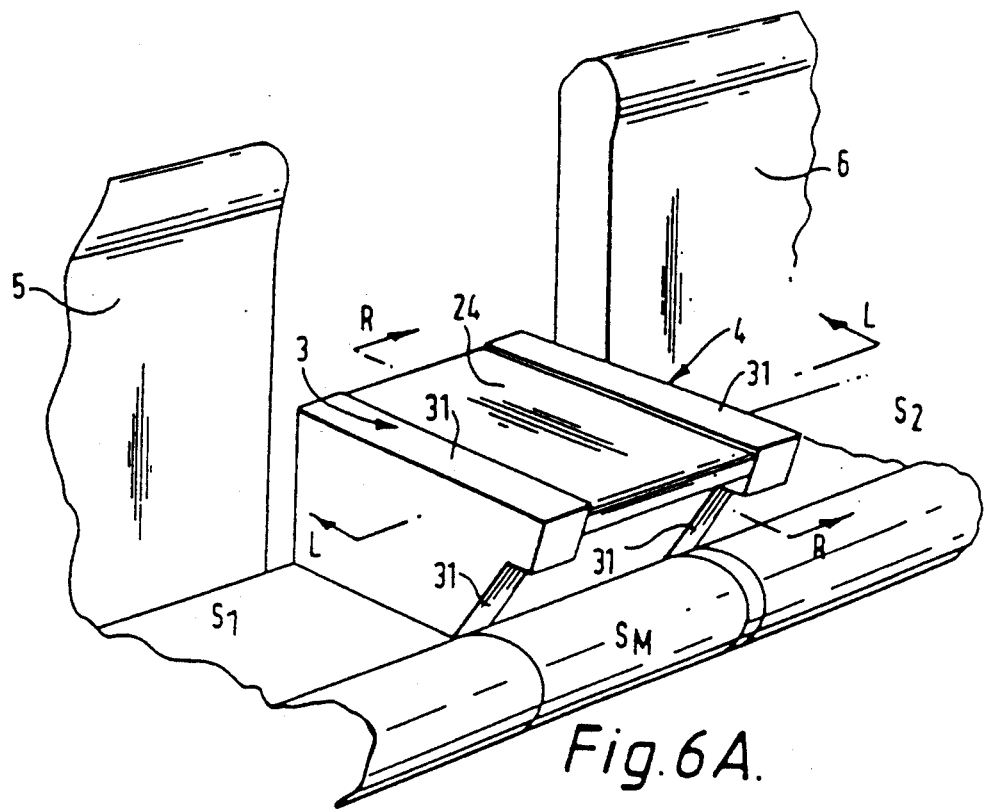
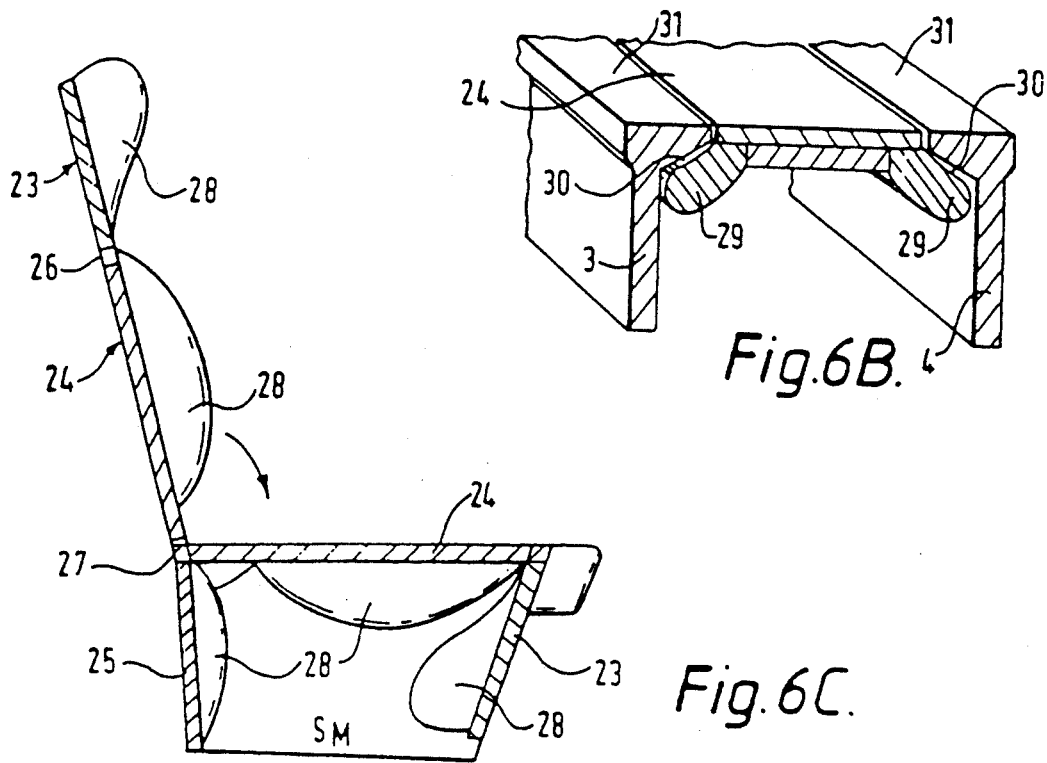

SEATING

FIELD OF THE INVENTION

The present invention relates to seating for use in aircraft.

BACKGROUND OF THE INVENTION

Scheduled airline carriers, as distinct from charter operators, offer three classes of seating, namely first, business and economy.

In order to maximise profitability scheduled airline operators arrange the seating in the aircraft based on predicted load factors, as between these three classes. Business class accommodation is recognized by all major carriers as the highest profit earner, and therefore the need arises for a high degree of flexibility as regards the provision of the number of business class seats to be provided on any particular route, because demand for such seats depends to a large extent on the route taken. For example, demand for business class accommodation on the London to New York run is high while that between London and Bombay for instance is normally low.

SUMMARY OF THE INVENTION

It is an object of the present invention to provide an aircraft seat which can be easily converted from an economy class seat sitting three persons, to a business class seat for occupance by two persons.

According to the invention there is provided a convertible aircraft seat comprising a seat frame, a plurality of sitting positions providable on said frame, each of which includes a separate seat back portion attached to said frame, a pair of arm dividers mounted for adjustable movement on said frame from a first position whereat to define a middle sitting position between two outer adjacent sitting positions, and a second position whereat said arm dividers are closer together to eliminate said middle sitting position and increase the width of said two outer adjacent sitting positions, and first means for adjusting the width of the seat back portions of said outer adjacent sitting positions to correspond to the widths thereof determined by the position of said arm dividers on said frame, and second means for adjusting the seat back portion of said middle sitting position to permit said adjustment of the seat back portions of the outer adjacent sitting positions by said first means.

Advantageously the seat-back portion of each outer adjacent seat is comprised of a main seat back frame to which is attached a pair of inter-engageable shell sections, one of which is slidable with respect to and within the other between two fixed positions thereby to vary the width of the said seat back portion.

To each shell structure is attached a length of foam padding forming the two outer limits of the respective seat back portion between which may be inserted a removal length of foam padding of a size corresponding respectively to a closed interengaged position of the seat shell sections forming an enconomy class seat, and a pulled apart position of the seat shell sections forming a business class seat.

The seat back portion forming the middle sitting position in the economy class configuration of the seat, may comprise a foam padded seat back cover removably mounted over a central frame section, attached to the main seat frame. The central frame section is of lesser width than the width of the chosen economy class middle sitting position, such that with the foam padded cover removed the arm dividers may be moved towards one another to eliminate the middle sitting position and widen the two outer sitting positions to business class dimensions.

The central frame section of the middle sitting position may be provided with a tray hinged thereto which, in the folded-up position corresponding to the three seater economy class configuration of the convertible seat, is held within the foam padded seat back cover mounted over the central frame section.

Thus in the two seater business class configuration with the arm dividers moved to the said second fixed position, the tray may be folded down between the arm dividers for use by passengers sitting in the two outer adjacent seats.

Embodiments of the invention will now be described by way of example with reference to the accompanying drawings.

BRIEF DESCRIPTION OF THE DRAWINGS

FIG. 3A is a top schematic illustration of one form of structure for the seat backs of the two outer seats of the convertible aircraft seat shown in FIG. 1 in an expanded, business, configuration including a rear table;

FIG. 3B is similar to FIG. 3A, but the seat back is shown in a contracted, economy, configuration and does not include a rear table;

FIG. 3C is an exploded perspective view of a portion of the structure of FIG. 3B, with some additional structure;

FIG. 6A of FIG. 6 is a perspective view of the middle section of a convertible seat according to another embodiment of the invention;

FIG. 6B of FIG. 6 is a sectional view along the line L—L of all FIG. 6A; FIG. 6C of FIG. 6 is a sectional view along the line R—R of FIG. 6A.

BEST MODES OF CARRYING OUT THE INVENTION

Figure 1:
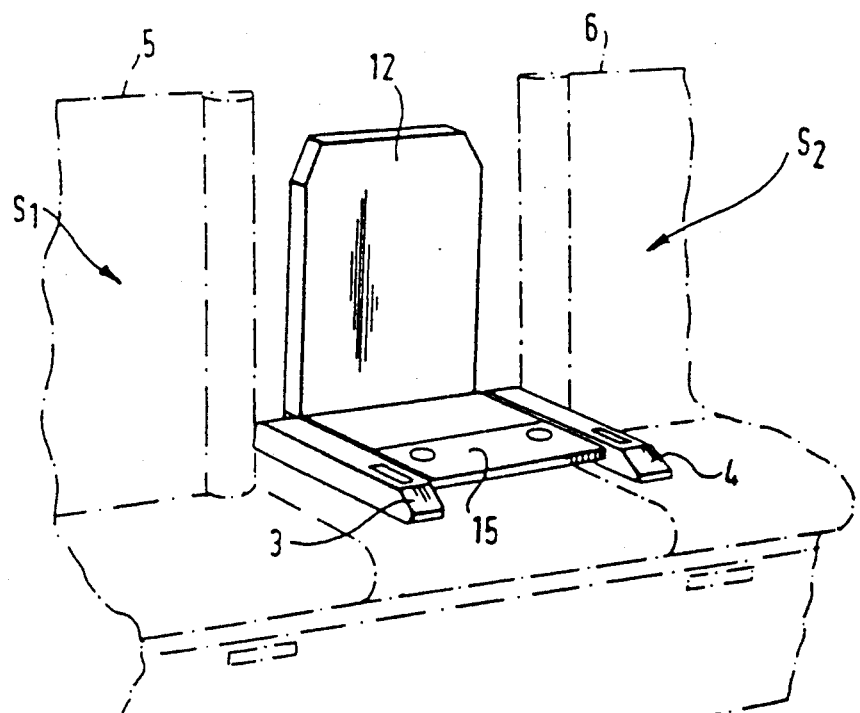
FIG. 1 is a schematic perspective view of a convertible aircraft seat converted for use as business class seating particularly for short haul use.
Figure 2:
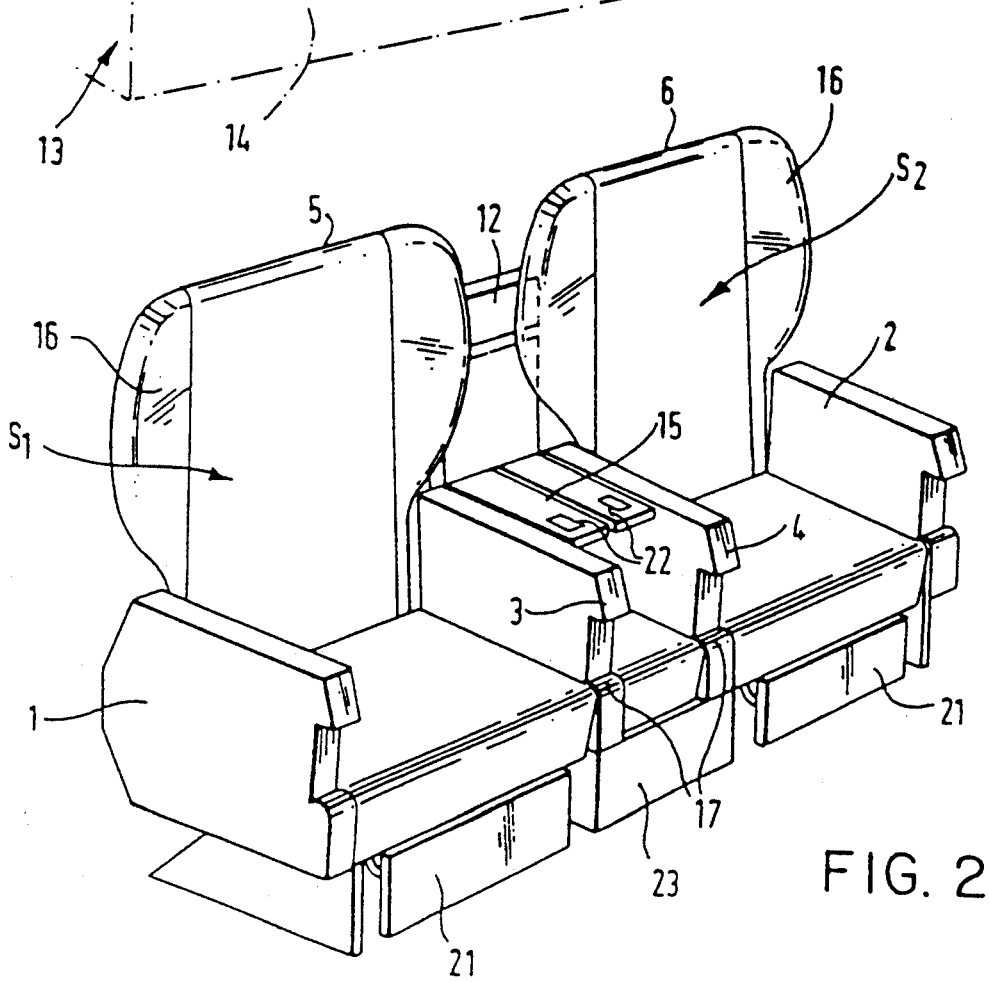
FIG. 2 is a schematic perspective view of another embodiment of a convertible aircraft seat converted for use as business class seating particularly for long haul use.
Figure 5A:
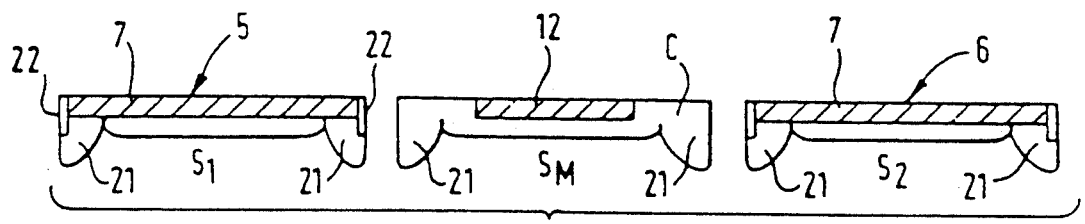
FIG. 5A of FIG. 5 illustrates the position of the seat backs in a three seater configuration of a convertible seat for economy class usage according to another embodiment of the invention.

The convertible aircraft seat particularly shown in FIGS. 1 and 2 of the accompanying drawings, comprises a main support frame (not shown), to which is attached two end arm rests 1 and 2 and a pair of central arm dividers 3 and 4 movable between two fixed positions on the main frame, the first position at a spacing therebetween to provide a middle sitting position see FIG. 5A and two adjacent outer sitting positions S1 and S2 in an economy class configuration of the convertible seat, and the second position, as shown in the drawings, where the central arm dividers 3 and 4 are moved together to widen the two outer sitting positions S1 and S2 for business class use.

Each outer sitting position S1 and S2 is provided with a seat back 5 and 6 each of which is formed of a central frame 7 see FIG. 3, articulated to the main support frame, to provide recline facilities.

The central frame 7 of the seat backs 5 and 6 of the convertible seat shown in FIG. 1 normally employed for use on short haul aircraft, has attached thereto a pair of interengagable shell sections 8 and 9, see FIG. 3 each of which is provided with a length of foam padding 10 and 11 along their outer edges, and a length of removable foam padding inserted between them to complete the seat back.

The removable length of foam padding has two sizes A and B, the one of smaller width A being employed in the economy class configuration of the convertible seat, and the one of larger width B for use in the business class configuration of the convertible seat.

The outer shell 8 is held in a fixed position on the central frame 7 and the other 9, slidable with respect thereto together with the foam padded length 10 attached thereto between predetermined fixed positions on the frame, the collapsed fixed position of the shell sections using foam padded insert A, corresponding to economy class configuration, and the expanded fixed position, using foam padded insert B, corresponding to business class configuration of the two outer sitting positions S1 and S2.

The middle sitting position of both the seats shown in FIGS. 1 and 2, comprises a central frame 12 which is reclinable on the main seat support frame, and a foam padded cover C see FIG. 5A for example removably located over the central frame 12, when the seats are converted to economy class usage.

Beneath the convertible seat is located a box structure 13 which, in the short haul version of the convertible seat as shown in FIG. 1, is provided with a cover lid 14. The box structure 13 is used to store removable items of the convertible seat shown in FIG. 1, namely the padded cover for the central frame 12 and the foam padded inserts A and B.

The central frame 12 may be provided with a hinged tray 15, which is located in its folded-up position within the removable foam padded cover for the central frame 12, and which then may be lowered, when that cover is removed, to lie between the central arm dividers 3 and 4 in the business class configuration shown in FIGS. 1 and 2. In the short haul business class configuration as illustrated in FIG. 3 meal tables M will be attached to the rear of each outer seat back 5 and 6 for use by the passenger sitting behind in the normal way. The meal table for the seat back of the middle sitting position (although not shown in the drawings) is specially constructed to cater for conversion as between economy and business class usage and to this end may be provided with foldable side leaves which are opened out when the seat is adapted for economy class use to correspond to the widths of adjacent tables.

In an alternative construction of the convertible seat shown in FIG. 2, the seat backs 5 and 6 are mounted to the main support frame for movement bodily thereon between positions corresponding to economy and business class usage, thus obviating the need for the shell structures 8 and 9 and special seat inserts A and B.

When positioned for business class usage therefore, with the arm rests 3 and 4 moved to their inner positions and the cover removed from the central frame 12 of the seat back of the middle sitting position, room is provided for side bolsters 16 to be attached to each side of the seat backs 5 and 6 as shown. The use of side bolsters 16 creates an additional visual effect which acts to distinguish the seat as being for business rather than economy class usage.

Figure 4A:
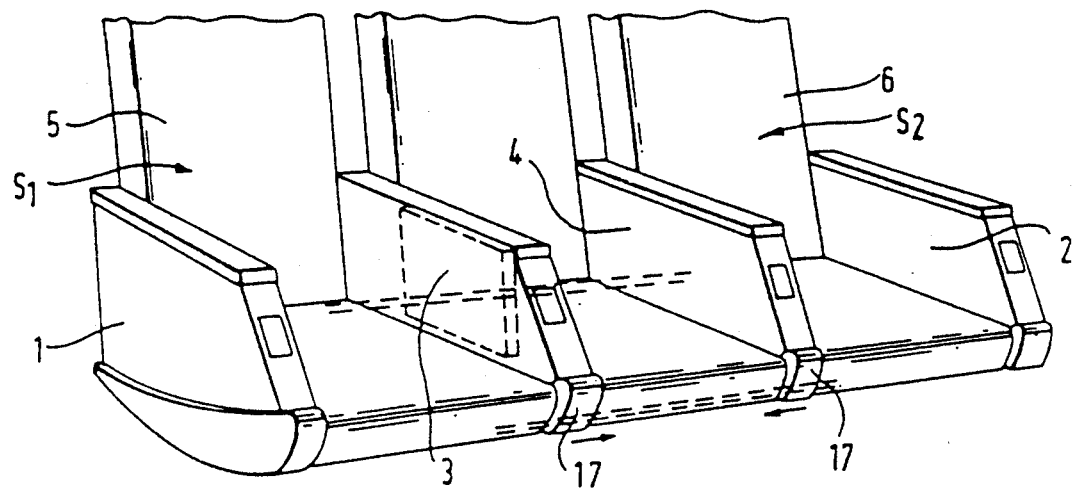
FIG. 4A is a perspective view of an alternative form of construction of the arm dividers of the convertible seat shown in FIGS. 1 and 2 primarily for use on long haul routes.
Figure 4B:
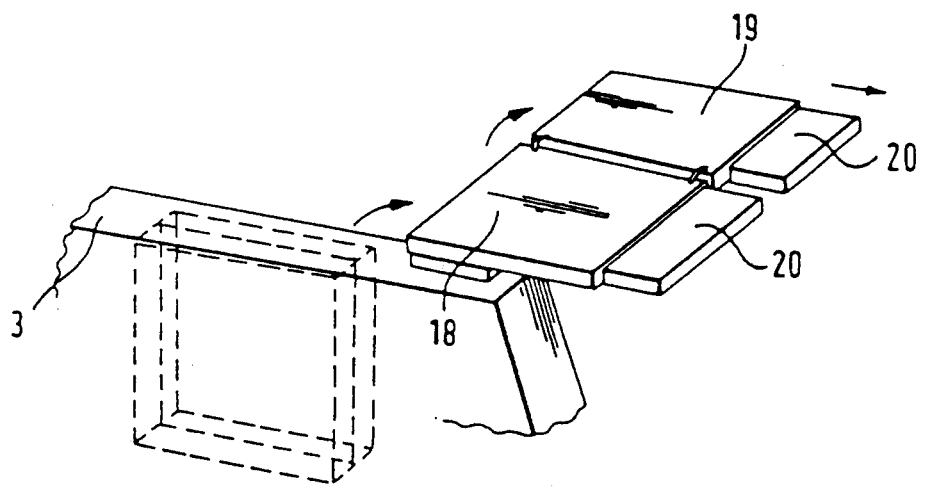
FIG. 4B is an enlargement of a portion of FIG. 4A with a tray thereof in a deployed configuration.

For the long haul conversion the arm dividers 3 and 4 may be flush panelled and movable on the main seat support frame by means of front and rear slides, the front slides 17 being shown in FIGS. 2 and 4. Since with long haul business class usage the distance provided for additional leg-room, between one bank of seats and the next is too large to permit the incorporation of in-back tables, full size in-arm tables are built into the outer arm 1 and 2 and a special in-arm table in either central arm divider 3 and 4. An illustration of a typical in-arm table is illustrated in FIG. 4, comprised of two articulated halves 18 and 19 each provided with slide extension pieces 20. The in-arm tables may then be opened up in front of the passenger commensurate with the demands of long haul business class usage.

Further, as shown in the long haul version of the convertible seat in FIG. 2, leg rests 21 are located beneath the two outer seats S1 and S2 and the foldable tray 15 may then contain buttons 22 to operate the leg rests 21. In this configuration a main storage compartment 23 for the removable items of the seat, is located between the legs rests 21.

When the FIG. 2 long haul configuration is converted to economy class usage, the tray 15 will be stored away thus disabling the means for activating the leg rests 21. When the drop down tray 15 between the arm dividers 3 and 4 has been deployed, other facilities such as leather document holders and individual reading lights may be revealed which are built into the central frame 12.

Although the invention has been described with reference to two convertible seat embodiments particularly suitable for short haul and long haul usage, it will be appreciated that the short haul version could be used for long haul purposes and vice-versa or indeed a mixture of both seats on either short haul or long haul routes. Also the arm dividers 3 and 4 of the short haul version could be constructed as the arm dividers 3 and 4 described above for the long haul version.

However it is to be noted that the above described short haul version is mechanically simpler in construction and requires less time to convert than the long haul version, which is an added convenience when an aircraft is being used on short haul routes and the time available between stop-overs for example, is limited.

Figure 5B:
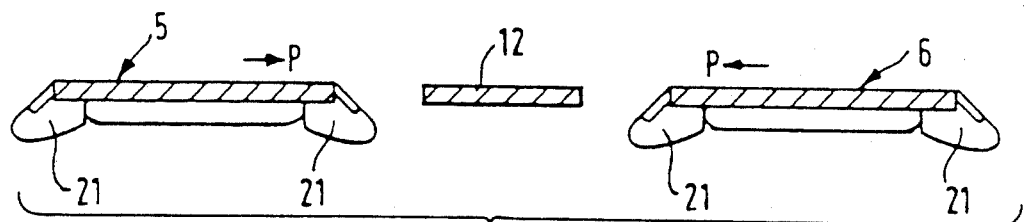
FIG. 5B of FIG. 5 illustrates the position of the seat back of FIG. 5B adjusted for business class usage.
Figure 5C:
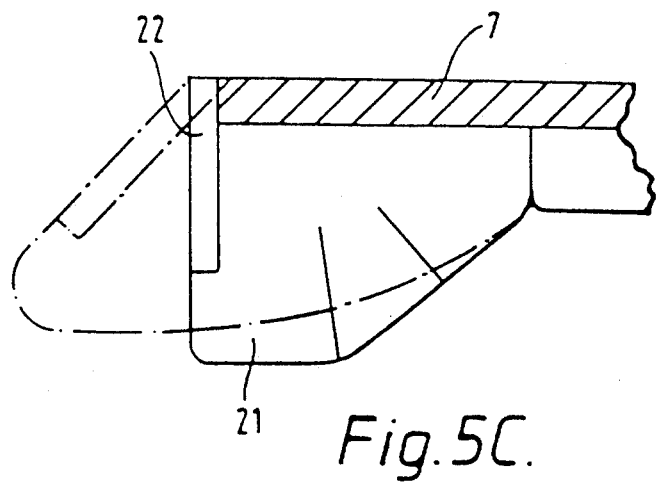
FIG. 5C of FIG. 5 is a schematic illustration of the adjustable side bolsters of the seat backs shown in 5A and 5B.

In order to reduce the number of mechanical operations during seat conversion, and the requirements of storage space the detachable side bolsters 16, as illustrated in FIG. 2, may be replaced with pivotally movable side bolsters 21 shown in FIG. 5, hinge mounted at 22 to the back structure 7 of the seat backs 5 and 6.

FIG. 5A of FIG. 5 illustrates the position of the seat backs in a three seater configuration of the convertible seat for economy class usage, and FIG. 5B illustrates the position of the seat backs in a two seater configuration for business class usage, the seat backs 5 and 6 being movable bodily on the seat frame to their positions shown in FIG. 5B in the direction of the arrow P.

The bolsters 21 are formed of a compressible foam material covered with seat upholstery, a concertina section (not shown) being incorporated in the upholstery at the junction of the bolsters 21 with the main back seat padding, to permit bolster movement between their positions shown in FIG. 5A and FIG. 5B.

The width of the backs of the seats $S_1$ and $S_2$ in the FIG. 5B position is thereby effectively increased by opening out the bolsters 21 as shown to their "winged" position, for business class usage.

Moreover, the need to incorporate a removable cover C for the middle seat centre frame 12 and provide a separate storage area therefor when not in use, may be obviated using the alternative construction shown in FIG. 6.

In this embodiment the frame of the back of the middle seat $S_M$ is formed of three separate panel sections 23, 24 and 25, see FIG. 6C.

The width of the panel sections 23 and 24 corresponds to the distance between the arm dividers 3 and 4 when moved to their closest position to one another corresponding to the business class configuration of the convertible seat.

The sections 23 and 24 are articulated for folding movement with respect to one another at 26, and to the section 25 at 27, from a rigid upright position as shown.

Foam padding 28 covers the panel sections 23, 24, 25 and forms projecting wing shaped side bolsters 29 see FIG. 6B.

The arm dividers 3 and 4 are provided with undercut portions 30 on their facing sides and extending along and beneath the arm rest outer surfaces 31 thereof, see FIGS. 6A and 6B.

To achieve the business class configuration, see FIG. 6A, the arm rest 3 and 4 are first moved to the position shown whereat the distance between them corresponds to the width of the seat back panel sections 23 and 24 as mentioned above.

The sections 23 and 24, together with the foam padding attached thereto are then folded down between the arm dividers 3 and 4 such that the sections 23 and 24 form respectively the front and top wall of a centre box structure, with the dividers 3 and 4 forming the sides thereof, between the sitting position $S_1$ and $S_2$ as shown in FIG. 6C, with the compressible side bolsters 29 tucked beneath the undercuts 30.

Advantageously a suitable locking device may be provided (not shown) between the panel sections 23 and 24 such that the panel sections 23 and 24 may be folded to the box structure formation shown in FIG. 6A before the arm dividers 3 and 4 are moved closer together, and retained in that position by actuating the locking device.

Thereafter the arm dividers 3 and 4 are solid along the frame of the seat to abut the seat back sections 23 and 24, and complete the centre box structure with the side bolsters 29 nesting in the undercut positions 30.

We claim:

1. A convertible aircraft seat comprising a seat frame, a plurality of sitting positions providable on said frame, each of which includes a separate seat back portion attached to said frame, a pair of arm dividers mounted for adjustable movement on said frame from a first position whereat to define a middle sitting position in between two outer adjacent sitting positions and a second position whereat said arm dividers are closer together to eliminate said middle sitting position and increase the widths of said two outer adjacent sitting positions, and first means for adjusting the widths of the seat back portions of said outer adjacent sitting positions to correspond to the widths thereof determined by the position of said arm dividers on said frame; and second means for adjusting the seat back portion of said middle sitting position to permit said adjustment of the seat back portions of the outer adjacent sitting positions by said first means.

2. A seat as claimed in claim 1 wherein the seat back portion of each outer adjacent seat is comprised of a main seat back frame to which is attached a pair of interengageable shell sections, one of which is slidable with respect to and within the other between two fixed positions thereby to vary the width of the said seat back portion.

3. A seat as claimed in claim 2 wherein a length of foam padding is attached to each shell structure, said foam padding forming the two outer limits of the respective seat back portion between which may be inserted a removable length of foam padding of a size corresponding respectively to a closed interengaged position of the seat shell sections forming an economy class seat, and a pulled apart position of the seat shell sections forming a business class seat.

4. A seat as claimed in claim 1 wherein the seat back portion forming the middle sitting position in the economy class configuration of the seat, comprises a foam padded seat back cover removably mounted over a central frame section attached to the main seat frame.

5. A seat as claimed in claim 4 wherein said central frame section is of lesser width than the width of the chosen economy class middle sitting position, such that with the foam padded cover removed the arm dividers may be moved towards one another to eliminate the middle sitting position and widen the two outer sitting positions to business class dimensions.

6. A seat as claimed in claim 5 wherein said central frame section may be provided with a tray hinged thereto, which, in the folded up position corresponding to the three seater economy class configuration, is held within the foam padded seat back cover mounted over the central frame section, and in the two seater business class configuration with the arm dividers moved to said second fixed position, may be folded down between the arm dividers for use by passengers sitting in the two outer adjacent seats.

7. A seat as claimed in claim 1 wherein the seat back of the middle sitting position comprises a foam padded seat back cover removably mounted over a central frame section attached to the main seat frame.

8. A seat as claimed in claim 7 wherein the seat back portion of two outer adjacent sitting positions are movably mounted on the seat frame, for positioning centrally of the sitting positions formed with said arm dividers moved to eliminate said middle position, and said seat back cover of the middle seating position removed.

9. A seat as claimed in claim 8 wherein detachable side bolsters are provided for attachment to the sides of the seat back portions of the two outer adjacent sitting positions with the seat back position of the two outer adjacent sitting positions in said central position and said seat back cover removed.

10. A seat as claimed in claim 1 wherein the seat back of the middle sitting position is formed of three articulated panel sections, the width of the top and middle sections corresponding to the space between the arm dividers in said second position thereof.

12. A seat as claimed in claim 11 wherein the facing sides of the arm dividers have undercut portions beneath and along their respective outer surfaces for receiving the foam padding of the side bolsters on the seat back of the middle sitting position in the folded down position of the top and middle panel sections.

11. A seat as claimed in claim 10 wherein the top and middle panel sections are movable from a rigid upright position to a folded down position to form with the arm dividers when in said second position, a box structure between the two outer adjacent sitting positions.

* * * * *